(12) United States Patent
Newman et al.

(10) Patent No.: US 9,524,484 B1
(45) Date of Patent: Dec. 20, 2016

(54) WATER HANDLING SYSTEM

(71) Applicants: Frederic M. Newman, Midland, TX (US); James B. Story, Highland Village, TX (US); Meredith K. Peeler, Garland, TX (US); Jesse J. Lee, Allen, TX (US); Steven K. Stout, McKinney, TX (US); Kevin A. Vaughn, II, Sachse, TX (US)

(72) Inventors: Frederic M. Newman, Midland, TX (US); James B. Story, Highland Village, TX (US); Meredith K. Peeler, Garland, TX (US); Jesse J. Lee, Allen, TX (US); Steven K. Stout, McKinney, TX (US); Kevin A. Vaughn, II, Sachse, TX (US)

(*) Notice: Subject to any disclaimer, the term of this patent is extended or adjusted under 35 U.S.C. 154(b) by 214 days.

(21) Appl. No.: 14/209,355

(22) Filed: Mar. 13, 2014

Related U.S. Application Data

(60) Provisional application No. 61/786,091, filed on Mar. 14, 2013.

(51) Int. Cl.
*G06Q 30/00* (2012.01)
*G06Q 10/08* (2012.01)
*G06Q 30/04* (2012.01)

(52) U.S. Cl.
CPC ............ *G06Q 10/083* (2013.01); *G06Q 30/04* (2013.01)

(58) Field of Classification Search
CPC .............................. G06Q 10/083; G06Q 30/04
USPC .......................................................... 705/34
See application file for complete search history.

(56) References Cited

U.S. PATENT DOCUMENTS

| | | | | |
|---|---|---|---|---|
| 4,080,104 A | * | 3/1978 | Brown, Jr. ............ | A47L 7/0028 15/353 |
| 4,549,570 A | * | 10/1985 | Cook ........................ | B09B 1/00 137/389 |
| 5,242,604 A | * | 9/1993 | Young .................... | B01D 17/00 210/519 |
| 8,388,850 B2 | | 3/2013 | Delano | |

(Continued)

FOREIGN PATENT DOCUMENTS

FI   EP 2923316 A1 * 9/2015 ............. G06Q 10/08

OTHER PUBLICATIONS

P-18 Skim Oil Condensate Report Form, Texas Rail Road Commission 1986.*

(Continued)

*Primary Examiner* — Scott Zare
(74) *Attorney, Agent, or Firm* — bobharter.com; Robert J. Harter

(57) ABSTRACT

A method for handling water and oil automatically monitors and schedules the trucking of waste water between a disposal site and multiple well sites. In some examples, the method automatically detects the presence of a tanker truck at a well site and/or at the disposal site and records the truck's arrival and departure times. In some examples, the method monitors the changing level of waste fluid collected in a waste fluid storage tank at the well site and thereby determines the volume of waste fluid transferred from the tank to the truck. In some examples, the method also estimates the volume of waste fluid transferred from the well bore into the tank while the truck is withdrawing fluid from the tank. In some examples, the method automatically generates and posts online billing information and regulatory reports associated with waste water trucking, waste water disposal and oil reclaiming.

17 Claims, 8 Drawing Sheets

(56) References Cited

U.S. PATENT DOCUMENTS

| | | | | |
|---|---|---|---|---|
| 8,649,909 B1* | 2/2014 | Phillips | ............... | G05D 7/0676 |
| | | | | 700/1 |
| 9,342,078 B2* | 5/2016 | Phillips | ............... | G05D 7/0676 |
| 2003/0183382 A1* | 10/2003 | Newman | ............... | G07C 5/008 |
| | | | | 166/66 |
| 2012/0246039 A1* | 9/2012 | Fain | ...................... | G06Q 10/08 |
| | | | | 705/32 |

OTHER PUBLICATIONS

Audit Procedures for Oil and Gas Well Servicing; by Texas Comptroller of Public Accounts, Audit Division; dated May 2010.
Skim Oil/Condensate Report; by Railroad Commission of Texas, Oil and Gas Division; published as Form P-18, dated Jan. 1, 1986.

* cited by examiner

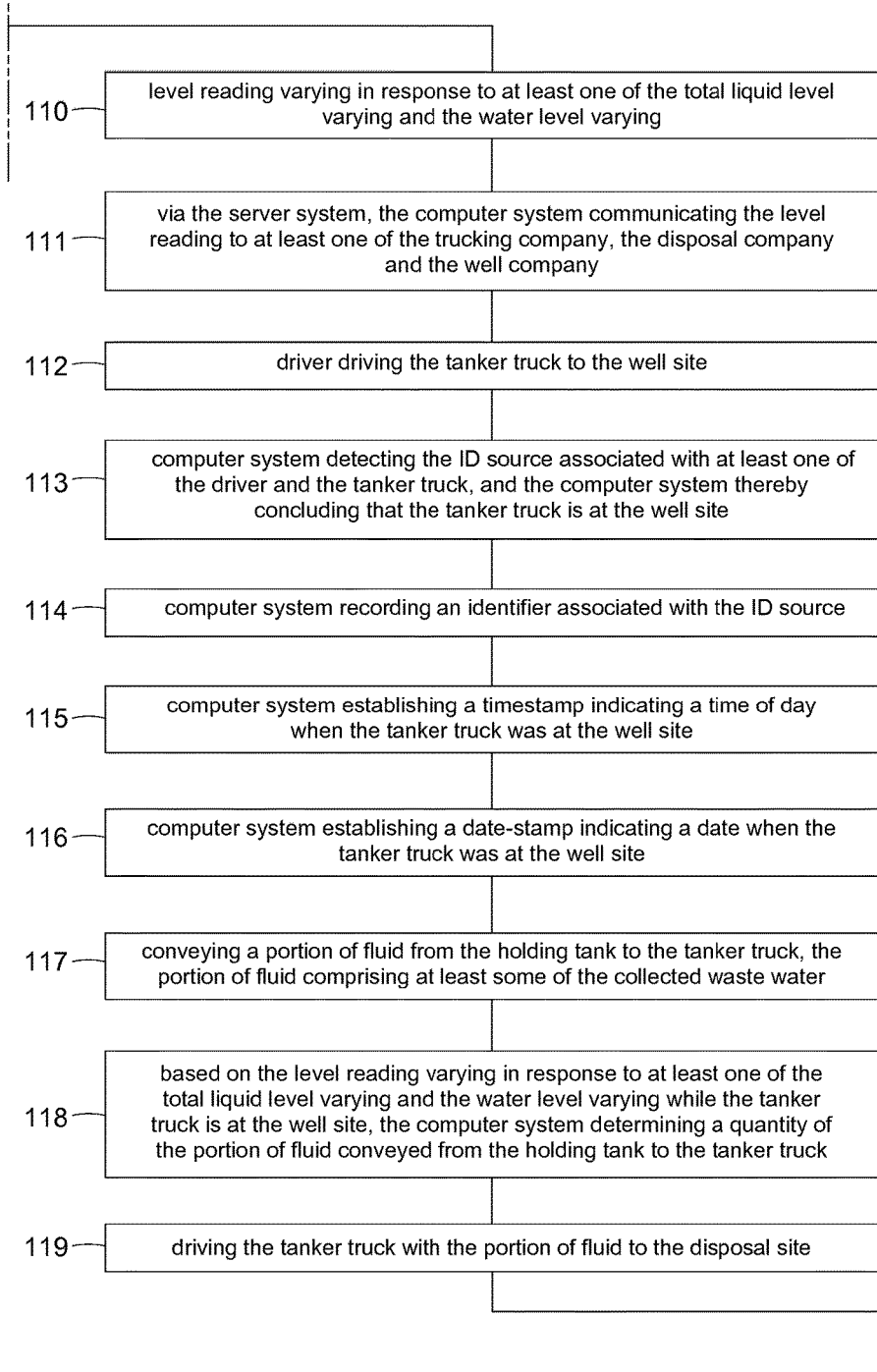

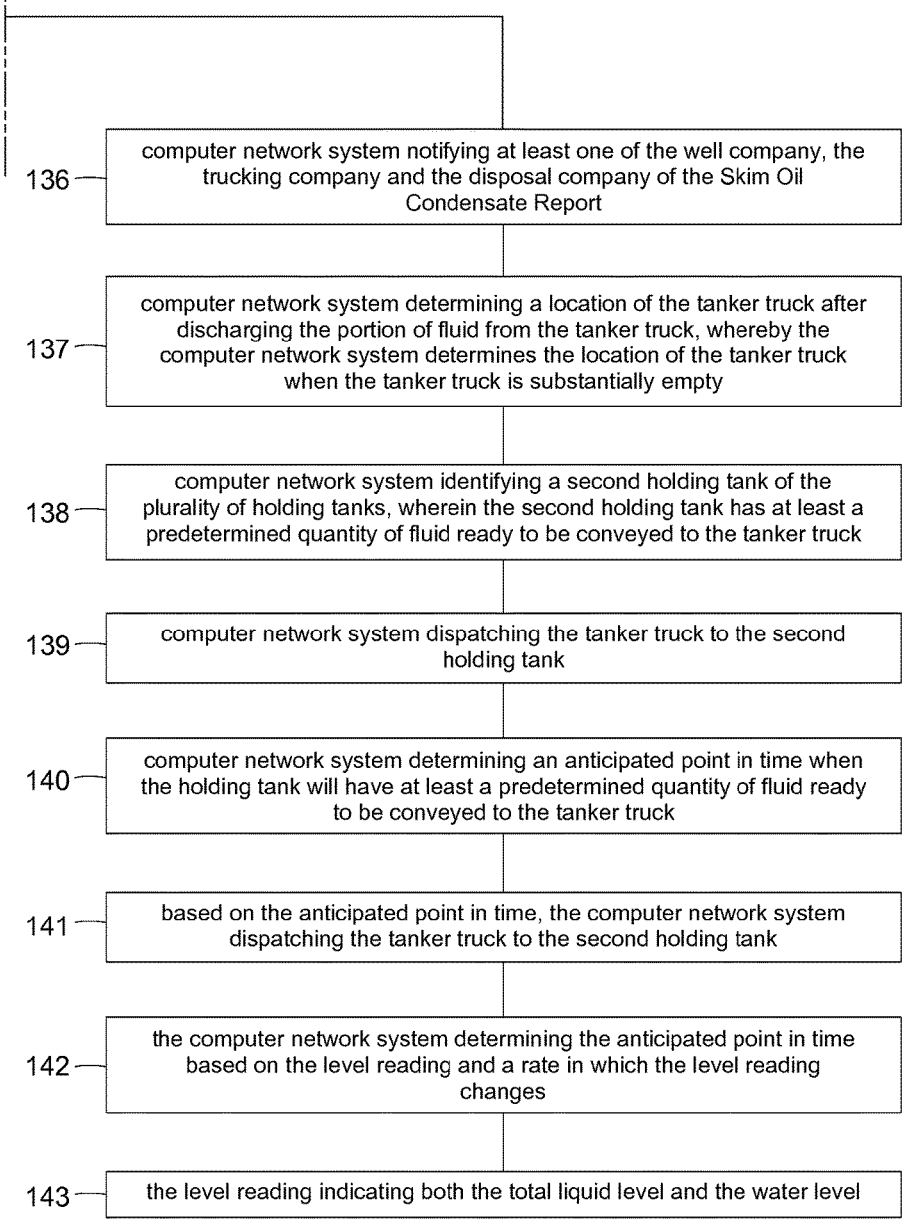

WATER HANDLING SYSTEM

CROSS REFERENCE TO RELATED APPLICATIONS

This application claims the benefit of provisional patent application Ser. No. 61/786,091 filed on Mar. 14, 2013.

FIELD OF THE DISCLOSURE

The subject invention generally pertains to water handling and more specifically to the transfer of water from remote well sites.

BACKGROUND

A well site is an area having a well or well bore that extends deep into the earth for extracting oil, gas and/or other fluids. Some wells produce a combination of oil and waste water. The oil is usually sold while the water is separated from the oil and disposed of. In some cases, the waste water is piped directly to a disposal reservoir. In other cases, the waste water is hauled by a truck to a disposal site. Current methods of servicing well operations are explained in a publication entitled, "Audit Procedures for Oil and Gas Well Servicing" presented in May of 2010 by the Texas Comptroller of Public Accounts, Audit Division.

BRIEF DESCRIPTION OF THE DRAWINGS

FIG. 5A-5E is a block diagram illustrating example methods for handling water and oil at a well site and a disposal site in accordance with the teachings disclosed herein.

DETAILED DESCRIPTION

Figure 1:
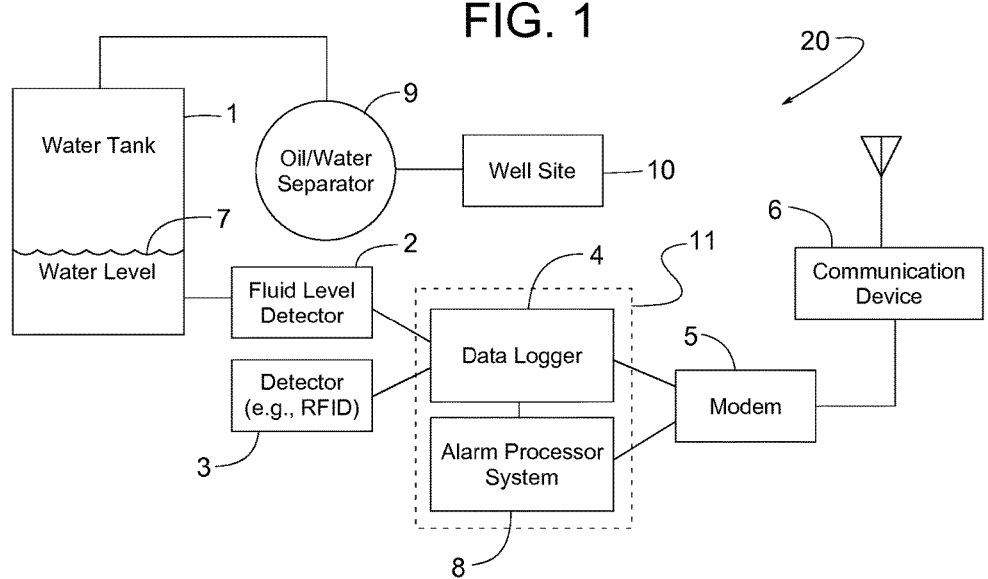
FIG. 1 is a schematic diagram illustrating example operations at a well site according the teachings disclosed herein.
Figure 2:
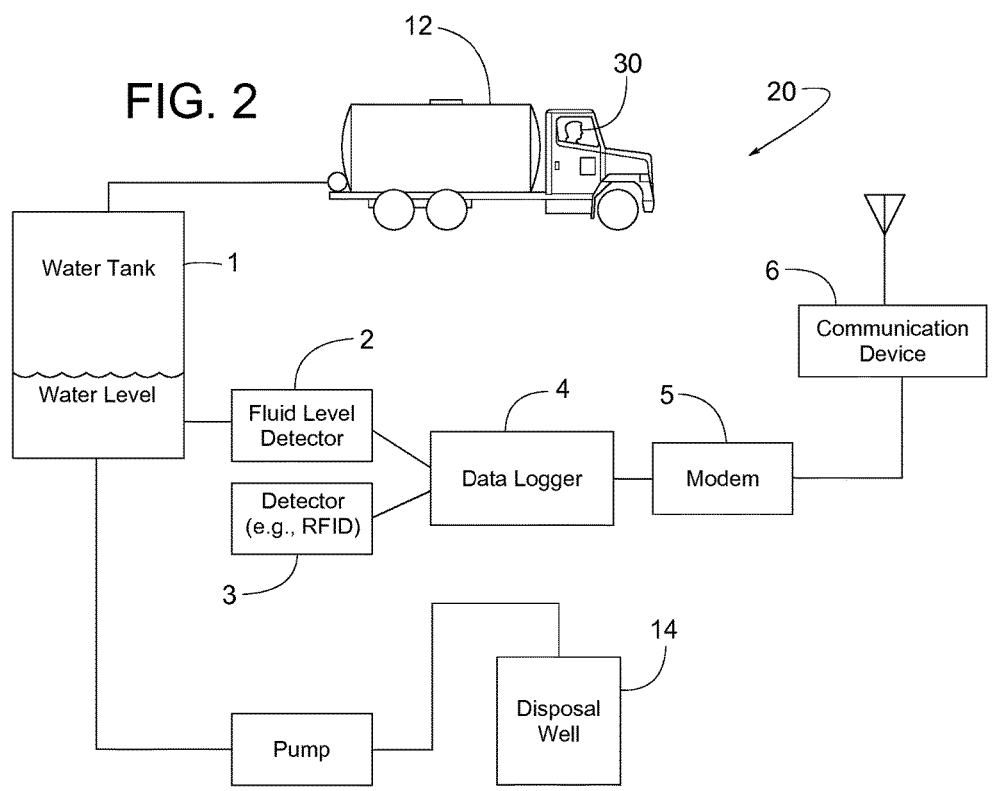
FIG. 2 is a schematic diagram illustrating example operations at a water disposal or supply site for disposing, storing and/or exchanging water from a reservoir (e.g., a disposal well, open pit, etc.) according the teachings disclosed herein.

FIGS. 1 and 2 show an automated water handling system 20 that can detect how much water was picked up at what well site 10, when, and where that water went. System 20 can also auto-populate regulatory forms like the Texas RRC P-18. The produced water from well site 10 is separated from the oil and gas and this water is stored in tank 1. Some examples include a SCADA (Supervisory Control and Data Acquisition) system. The water level detector 2 (liquid level sensor) can be any number of devices, examples of which include, but are not limited to, a major head switch (pressure sensor) which measures the hydrostatic pressure at the bottom of the tank, a Banner sonar gun which is mounted on top of the tank and senses the take level via sound, a guided wave radar sensor such as a Rosemount model 3302 or 3308 (wireless version), a capacitance system or something as simple as a float.

Liquid level sensor 2 sends data to a data logger 4 in the form of an electrical signal. Data logger 4 records the electrical signal(s). This signal can be digital or analog. Data logger 4 stores the data for transmission, normally would contain a clock and date stamp (data logger 4 associates each data entry with a date or timestamp). Alarm system 8 is a processor that has pre-selected alarm points (e.g., alarm system 8 may be configured with a set of user-defined alarm points). Example: Alarm system 8 might have or be configured to alert at a fluid level, for example, of 5 feet of fluid as show in water level 7 or 120 barrels of fluid or to alert based on the acceleration or velocity of fluid rise. When the user-configured or preselected threshold is reached, an alarm is sent to modem 5 or is dispatched via any number of mechanisms including, but not limited to, communications through communication device 6. In some examples, alarm processor 8 and data logger 4 will be included in the same monitoring unit 11. Some examples have a separate alarm processor, and in some examples the data logger and the alarm processor are in the same unit (example: Pace Scientific or a signal board computer). In other examples, alarm processor 8 will be located externally or in a centralized location and receive data logger 4 via communication through communications device 6. In some examples, monitoring unit 11 (in some examples including data logger 4 and alarm processor system 8) is provided by a single board computer running on an operating system, e.g., Linux.

In some examples, communication device 6 allows transmission of data to and from monitoring unit 11, wherein such data includes, but is not limited to, alarm signals and fluid level updates. In some examples, modem 5 is the device that processes the output from data logger 4 into a form that communication device 6 can understand. In some examples, modem 5 can process both the alarm signals as well as fluid level signals. In some examples, modem 5 sends its signal to communication device 6. Communications device 6 can be a cell phone, hard wire, Bluetooth, satellite device. Actually, communications device 6 can be any cellular device or modem, hard wire, Bluetooth, satellite device, or any form of communication device that can transmit data. Any form of communications device that can transmit data. In some examples, communications device 6 can conduct two-way communications, meaning another remote device can ping and ask it for information or it can transmit the data or alarms only. Monitoring unit 11 (processor 8 or logger 4) can send a signal to 6 to initiate a call out alarm or send data at regular intervals.

Detector 3 (e.g., RFID sensor, wireless access point, keypad, etc.) is any device that can detect a presence of a tanker truck 12 or person via authentication means such as a tag, tablet, phone, smart device app, or any other device or means used for authentication. Detector 3 communicates to data logger 4, which stores the date and time a truck 12 arrives on location (could be a swipe card or key punch pad . . . any device that will identify a truck 12 when it arrives on location). A first oil/water separator 9 dumps water from well 10 into tank 1.

An example method of operation is as follows: Produced water that is separated from the oil and gas stream is dumped into tank 1 from separator 9. As water is added to tank 1, fluid level 7 rises. As water in tank 1 is removed, level 7 is lowered. Fluid level 7 is being monitored and recorded in data logger 4 via liquid level sensor 2. Alarm system 8 has been programmed to send a "callout" signal to modem 5 or communication device 6 when a predetermined fluid level has been reached (e.g., five feet), or when the water rise acceleration has exceeded a predetermined threshold (e.g., 2 in/min). When fluid level 7 reaches that threshold of five feet or accelerates faster than 2 in/min, alarm system 8, in some examples, sends a signal to communication device 6, which sends a callout alarm to any one of many designated places—could be a driver's cell, a truck 12, a central office, etc. When the alarm is received, a pick up order is issued by a dispatch.

The dispatch person may wish to ping well site 10 to check the fluid level or to see the rate at which the fluid is rising in tank 1. Understanding the rate of fluid level rising gives the dispatcher an idea of how much time he has to get a truck 12 to the location. It may be hours or days.

When a truck 12 is dispatched and arrives at the location to load water, detector 3, in some examples, senses the truck 12 and sends a signal to data logger 4. Data logger 4 poles liquid level sensor 2 and records how much fluid is in tank 1. Logger 4 places a time and date stamp on the truck 12 arrival. Detector 3 detects when the truck 12 is driven off (out of range) and it sends a signal to logger 4. Logger 4 again poles fluid detector 2 for information. A time and date stamp is placed on the data.

We now know which truck 12 arrived on location, how long it was there, and how much fluid was removed from the tank. In some examples, that information will be sent to the central office when the truck 12 departs, however alternatives might be later on or maybe when the central office pings the well site and ask for the data. Regardless of when the data arrives in the central office, the data goes into a data base recording the following information: Customer ID, Well site ID, Truck ID, date and time, how much fluid was loaded and trucked off location, and/or other parameters as seen fit and useful.

FIG. 2 show what happens to truck 12 and water after it leaves the customer's well site 10. In some examples, detector 3 detects that the truck has arrived on location and sends a signal to logger 4. Logger 4 places a time and date stamp on the truck's arrival.

In some examples, it is not necessary to record how much water goes into the tank, pit or reservoir (e.g., disposal well 14) because the database knows how much water was removed from the production well site 10 (FIG. 1). It is safe to assume truck 12 left well 10 with a load and delivered that entire load to the disposal well 14.

Figure 3:
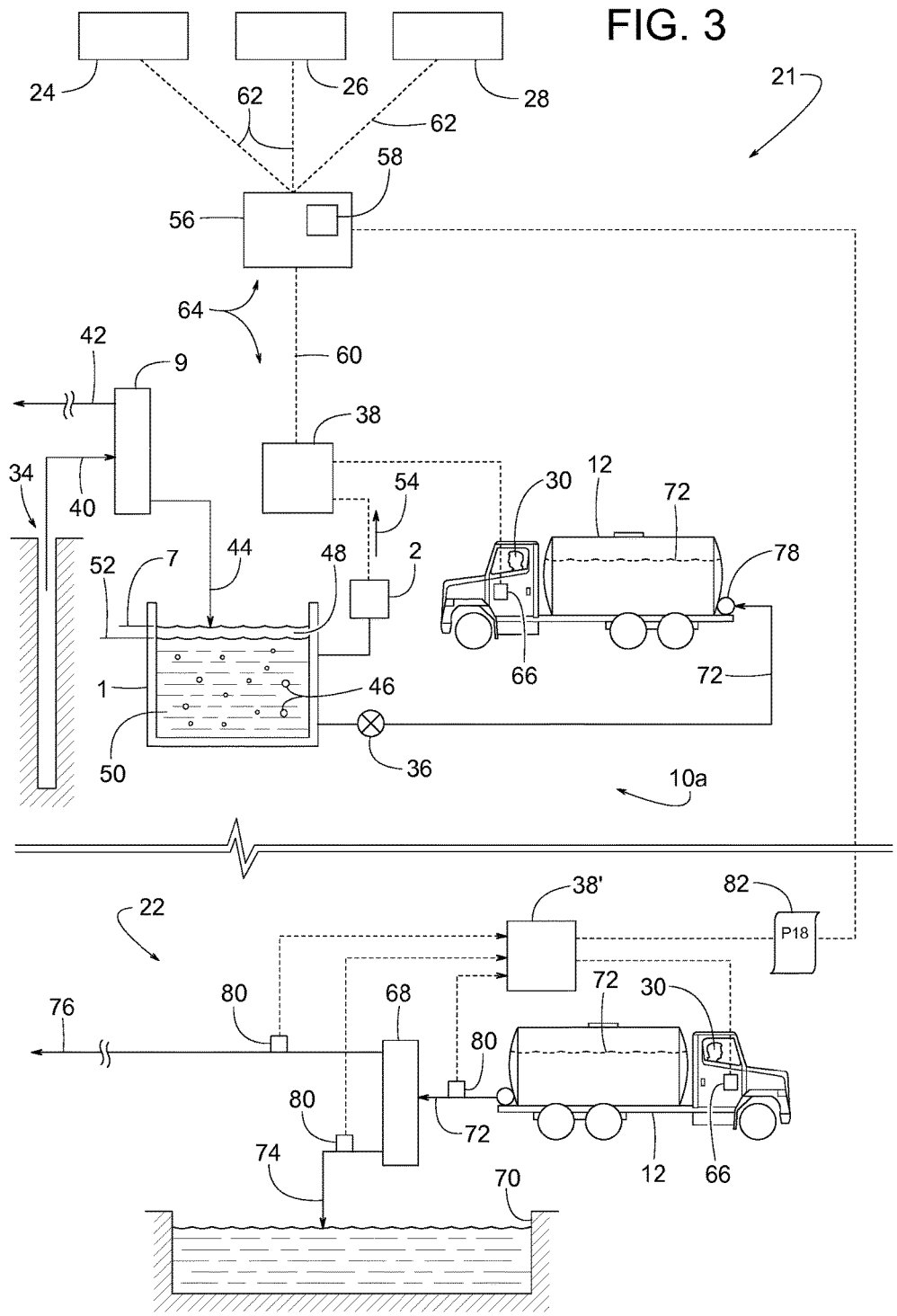
FIG. 3 is a schematic diagram illustrating an example method for handling water and oil at a well site and a disposal site, wherein the example method is in accordance with the teachings disclosed herein.

In some examples, disposal well 14 has tanks and the tank levels are recorded (similar method as in FIG. 1) when truck 12 arrives at a disposal site 22 (FIG. 3). One can determine how much water was unloaded by knowing the tank levels at the time when the truck arrives and departs.

In any event, the truck empties its water into disposal well 14 holding tank or pit. Detector 3 detects that truck 12 has departed the disposal site and sends the data to logger 4. Logger 4 places a time and date stamp on the departure. In some examples, data logger 4 will send the truck information to the central office thereby completing the hauling transaction at the time the truck departs. This tells the dispatcher the truck is empty and ready for another assignment. However it might be that the data will be sent later either in an auto mode or by the central office pinging the well site.

In any event, the whole transaction has been completed. A well company 24, a trucking company 26, and/or a disposal company 28 know where truck 12 picked up the water, how much, and when it was delivered to what well. The complete transaction has been completed and recorded. Companies 24, 26 and/or 28 know which well-produced the water, the truck picked up the water, how much water, when it was picked up, when it was delivered, and to what disposal well.

In some examples, data is processed as follows. In some examples, all disposal well operators submit monthly forms that disclose how much water came from each source. The data from this system can fill out that form. Example: Texas RRC form P-18. System 20 can complete this form automatically. Most water haulers (trucking companies) charge by the barrel, some by the hour. This data base has value for both for invoicing purposes. Currently, the cost of driving a water hauling truck (e.g., tanker truck 12) is very close to $4 per mile for fuel, driver, insurance, maintenance, and deprecation—very costly. If the water hauler has an empty truck driving near a well and if the central office has received an alarm that a water load is ready, a lot of mileage can be saved by the water hauling company. Getting the monthly invoices and reports out can be a very laborious task. To avoid a driver 30 having to fill out a ticket when he picks up and delivers the water, and to avoid a clerk having to sort all the tickets to get invoices out and then to fill in the regulatory reports, the data gathered and processed using system 20 disclosed herein saves lots of time.

In some examples, information gathered from system 20 can be used for billing or invoicing the customers, tracking trucks, and filling in regulatory reports (e.g., P-18). Well operator will now know exactly how much water their wells make per day or month. System 20 lends itself to an EDI billing system (electronic data interchange) for reducing paper waste.

Figure 4:
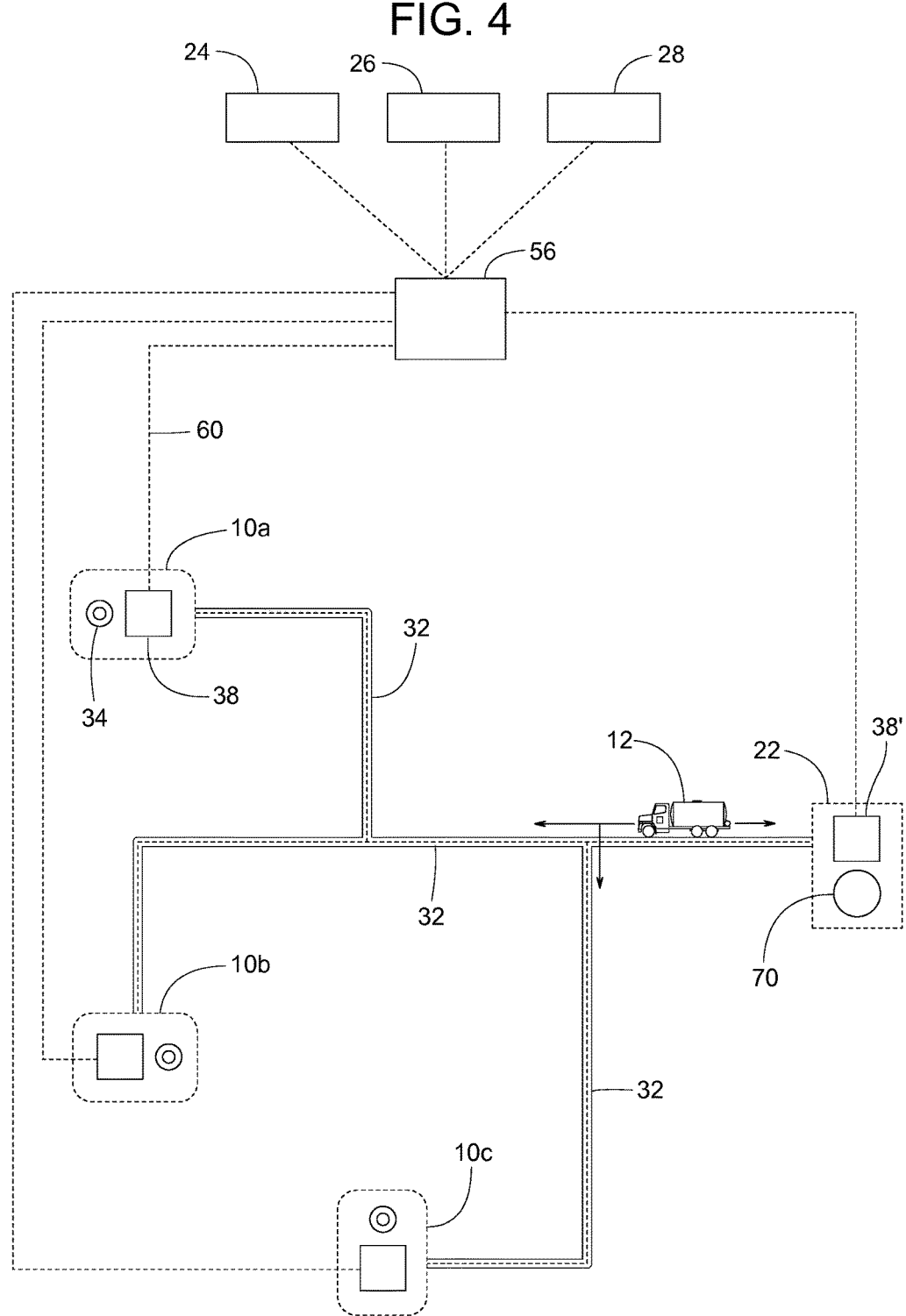
FIG. 4 is a schematic diagram illustrating an example method for handling water and oil at a plurality of well sites and at a disposal site, wherein the example method is in accordance with the teachings disclosed herein.

In addition or alternatively, an example method 21 for handling water and oil at a well site 10a and a disposal site 22 is illustrated in FIGS. 3, 4, and 5A-5E. FIG. 3 shows various elements used with method 21; FIG. 4 shows tanker truck 12 traveling over a network of roads 32 to and from disposal site 22 and a plurality of well sites 10a, 10b and 10c; and FIGS. 5A-5E show various method blocks associated with method 21. The term, "tanker truck" refers to any vehicle with a tank for hauling liquid, wherein the truck can have an integral tank or a trailer with a tank.

In some examples, a wellbore 34 (e.g., a producing well), first separator 9, holding tank 1, liquid level sensor 2, a drain valve 36 and a computer system 38 are at well site 10a. Wellbore 34 produces a mixture 40 of oil 42 and waste fluid 44, which first separator 9 separates into two flow streams. Oil 42 is sold and waste fluid 44 is conveyed to holding tank 1 for later disposal. Waste fluid 44 conveyed to tank 1 is comprised of water and entrained oil 46. While in holding tank 1, some of entrained oil 46 becomes disentrained from waste fluid 44 and floats to the surface to create a layer of oil 48 floating on top of the remaining collected waste fluid 50. The term, "disentrained" as used herein refers to liquid or solid matter that sinks or floats out of solution. Collected waste fluid 50 in holding tank 1 is basically the same as waste fluid 44 entering tank 1 but with less entrained oil 46.

Layer of oil 48 floating atop collected waste fluid 50 defines a water level 52 between collected waste fluid 50 and layer of oil 48. A total liquid level 7 in tank 1 is at the upper surface of the layer of oil 48. Some examples of sensor 2 sense and provide readings 54 that represent total liquid level 7. Some examples of sensor 2 sense and provide readings 54 that represent water level 52. And some examples of sensor 2 (e.g., a Rosemount 3300 Guided Wave Radar Level transmitter, model 3302, Emerson Electric Company of St. Louis, Mo.) sense and provide readings 54 that represent total liquid level 7 and further sense and provide additional readings 54 representing water level 52.

Computer system 38 is connected in communication with liquid sensor 2 and a server system 56. Companies 24, 26, 28 and others can access server system 56 by way of a website 58, the Internet, and/or other known means. The term, "server system" refers to any combination of software and computer hardware (e.g., satellites, computer, cell phone antennas, modem, Internet, etc.) that responds to requests across a computer network to provide, or help to provide, a network service. In some examples, wireless communication links 60 and 62 (e.g., radio waves, microwave, electromagnetic radiation, satellites, antennas, and combinations thereof) connect server system 56 to computer system 38 and companies 24, 26 and 28. In some examples, computer system 38 and server system 56 provide a computer network system 64, which in some examples, also includes one or more of the following: a second computer system 38', an ID source 66 and the computers of companies 24, 26 and 28.

Computer system 38, in some examples, includes detector 3, a router, and/or other means for detecting ID source 66 associated with tanker truck 12 and/or driver 30 of truck 12. The term, "ID source" refers to any element or person that helps identify truck 12 and/or driver 30. Examples of ID source 66 include, but are not limited to, an RFID element, a scannable card (barcode, QR code, magnetic stripe, etc.), a person or driver 30 entering an identifier into a keypad installed at well site 10a, a vehicle license plate photosensed with ANPR (automatic number plate recognition), a smartphone, a computer, a laptop computer, a tablet computer (e.g., iPad), a personal digital assistant, etc. In some examples, computer system 38 detects or otherwise communicates with some examples of ID source 66 via a wireless local area network (WLAN), such as, for example, Wi-Fi.

Some examples of computer system 38 comprise an SBC (single board computer) and a router. Some specific examples of computer system 38 comprises a Raspberry PI Model B SBC of the Raspberry Pi Foundation of UK and a Dovado router model TINY of the Dovado company of Dubai, United Arab Emirates. In some examples, the computer system's SBC processes data pertaining to liquid level readings 54, timestamps, date-stamps, flow rates, ID source identifiers, billing information, etc. In some example's the computer system's router detects the presence of ID source 66 and recognizes its identifier such as, for example, its MAC address (media access control address). In some examples, the router conveys the ID source identifier to the SBC. In some examples, the identifier is verified through user authentication software on the SBC or ID source 66. For instance, in some examples, the detected identifier of ID source 66 is compared to a database of preauthorized identifiers stored on the SBC, and computer system 38 responds accordingly.

In some examples, a second separator 68, a disposal reservoir 70 (e.g., disposal well 14, non-producing well, tank, pit, etc.), and computer system 38' are at disposal site 22. Computer system 38 and 38', in some examples, are similar with respect their having means for detecting ID source 66 directly or via manual input from driver 30, being able to receive inputs from one or more sensors, and having means for communicating with companies 24, 26 and/or 28 via server system 56. On an as-needed basis, tanker truck 12 transports a portion of fluid 72 (at least some collected waste fluid 50 plus perhaps some of the layer of oil 48) from well site 10a to disposal site 22. Tanker truck 12 discharges the portion of waste fluid 72, which, in some examples, is pumped through second separator 68. Separator 68 separates fluid 72 into two flow streams: a portion of waste water 74 and a portion of reclaimed oil 76. The portion of waste water 74 is disposed of in reservoir 70, and the reclaimed oil 76 can be sold and shipped to another location.

In some example operating sequences of method 21, waste fluid 44 from well bore 34 is conveyed to holding tank 1. As waste fluid 44 flows generally continuously into tank 1, liquid sensor 2 monitors the ever-rising total liquid level 7 of waste fluid 44 in tank 1 and conveys the increasing level readings 54 to computer system 38. Then, via server system 56, computer system 38 communicates level readings 54 and their rate of increase to company 24, 26 and/or 28. Based on the amount of waste fluid 44 and the rate at which the total liquid level 7 is rising, trucking company 26 timely dispatches an empty tanker truck 12 to well site 10a.

Upon truck 12 arriving at well site 10a, computer system 38 detects ID source 66 (detects directly or via manual input from driver 30 to a keypad) and establishes a timestamp indicating a time of day when truck 12 arrived, establishes a date-stamp indicating the date when truck 12 arrived, and records an identifier associated with ID source 66. Examples of such an identifier include, but are not limited to, a MAC address (media access control address), a telephone number, a string of alphanumeric characters (e.g., letters, numbers and/or symbols), a password (e.g., user authentication password), a name or employee ID number of worker 30, a company address, a license plate number of truck 12, etc. The term, "user authentication password" refers to any identifier that is compared to a database of preauthorized identifiers. Computer system 38 communicates the timestamp, the date-stamp, and/or the identifier to server system 56, which makes the information available to companies 24, 26 and/or 28.

In some examples, computer system 56 validates the identifier by comparing it to a database of preauthorized identifiers and accordingly allows or denies the tanker truck's access to holding tank 1. Computer system 38 can selectively allow or restrict such access by various means including, but not limited to, opening or closing valve 36 leading to tank 1, opening or closing a lock on valve 36, unlocking or locking a gate leading from road 32 to well site 10a, and unlocking or locking a gate leading to holding tank 1.

With access to holding tank 1, a pump system 78 on tanker truck 12 transfers collected waste fluid 50 (and perhaps some of the layer of oil 48) from tank 1 to tanker truck 12. Once truck 12 completes its withdrawal of fluid from tank 1, truck 12 departs well site 10a. In some examples, computer system 38 recognizes when ID source 66 has left well site 10a, in which case computer system 38 records a timestamp indicating a time of day when truck 12 departed and records a date-stamp indicating the date when truck 12 departed.

In some examples, computer system 38 records data pertaining to sampled level readings 54 of level sensor 2. Examples of such data include, but are not limited to, level reading 54 when truck 12 arrives at well site 10a, level reading 54 when truck 12 departs well site 10a, level reading 54 when it begins decreasing due to truck 12 extracting fluid from tank 1, level reading 54 when it stops decreasing due to truck 12 terminating its withdrawal of fluid from tank 1, multiple level readings 54 sampled at time-spaced intervals prior to truck 12 arriving at well site 10a, and multiple level reading 54 at time-spaced intervals after truck 12 departs well site 10a. Multiple level readings 54 at time-spaced intervals plus dimensional specifications of tank 1 provide means for calculating the flow rate of waste fluids 44 and 72 and their total volume.

In some examples, the multiple level readings 54 sampled before and/or after truck 12 is at well site 10*a* indicates the flow rate at which waste fluid 44 was flowing from separator 9 to tank 1 during those periods. Such flow rates (considered individually or averaged), when multiplied by the length of time truck 12 was withdrawing fluid, can provide the basis for calculating an estimated volume of waste fluid 44 that separator 9 discharged into tank 1 while truck 12 was withdrawing fluid 72. In some examples, the total amount of waste fluid 72 transferred from tank 1 to truck 12 is calculated based on the change in level readings 54 as truck 12 is withdrawing waste fluid 72 plus the estimated volume of waste fluid 44 that separator 9 added to tank 1 while truck 12 was withdrawing waste fluid 72 from tank 1.

After tanker truck 12 completes its withdrawal of at least a portion of waste fluid 72, truck 12 departs well site 10*a* and eventually travels along road 32 to disposal site 22 for unloading.

Upon truck 12 arriving at disposal site 22, computer system 38' detects ID source 66 and establishes a timestamp indicating a time of day when truck 12 arrived at disposal site 22, establishes a date-stamp indicating the date when truck 12 arrived, and records the identifier associated with ID source 66. Computer system 38' communicates the timestamp, the date-stamp, and/or the identifier to server system 56, which makes the information available to companies 24, 26 and/or 28.

In some examples, computer system 38' validates the identifier and accordingly allows or denies the tanker truck's access to second separator 68 and/or to disposal reservoir 70. Computer system 38' can selectively allow or deny such access by various means including, but not limited to, opening or closing a valve leading to disposal reservoir 70, opening or closing a valve leading to second separator 68, unlocking or locking a gate leading from road 32 to disposal site 22, and unlocking or locking a gate leading to second separator 68 and/or to disposal reservoir 70.

With access to disposal site 22, tanker truck 12 discharges the portion of waste fluid 72, which, in some examples, is pumped through second separator 68. Separator 68 separates fluid 72 into two flow streams: a portion of waste water 74 and a portion of reclaimed oil 76. The portion of waste water 74 is disposed of in reservoir 70, and the reclaimed oil 76 can be sold and shipped to another location. After unloading the waste fluid, truck 12 is free to leave. In some examples, computer system 38' detects the departure of truck 12 and records a timestamp and date-stamp of the truck's departure.

In some examples, one or more sensors 80 (e.g., fluid flow sensors, pressure sensors, fluid level sensors, and/or combinations thereof, etc.) determine the volume of the portion of waste water 72 and/or the portion of reclaimed oil 76, and that information is conveyed to computer system 38'. With this information in addition to the information gathered by computer system 38 at well site 21, computer system 38', computer system 38, server system 56, and/or the computers of company 24, 26 and/or 28 generate billing information and other relevant documents. The term, "billing information" refers to any data, facts, readings or figures related to the cost, expense, fees or charges associated with withdrawing waste fluid from well site 10*a*. Examples of such billing information and other documents include, but are not limited to, an invoice to well company 24 for the cost of trucking and disposal of a portion of waste fluid 72, an automatic transfer of funds from well company 24 to trucking company 26 and/or to disposal company 28 to settle the invoice, and a computer generated and completed Skim Oil Condensate Report 82 (e.g., a Form P-18 of the Railroad Commission of Texas Oil and Gas Division). In some examples, the Skim Oil Condensate Report 82 discloses the volumes of reclaimed oil 76 and waste water 74 unloaded at disposal site 22. In some examples, at least one of well company 24, trucking company 26 and disposal company 28 accesses server system 56 to help process an invoice based on the billing information. The term, "help process an invoice" as used herein means to submit the invoice, record the invoice, view the invoice, access data that serves as a basis for the invoice, or pay the invoice.

In some examples, computer system 38, computer system 38' and/or server system 56 provides certain examples of ID source 66 (e.g., a computer, a smartphone, a laptop computer, a tablet computer, a personal digital assistant, etc.) with dispatch information that directs tanker truck 12 to its next destination. The next destination, for example, could be the next well site that needs waste fluid removed. Examples of dispatch information include, but are not limited to, a well site name, a well site identifier, a well site address, GPS coordinates of a well site, a map, etc. In some examples, the dispatch information is conveyed to driver 30 around the time that method 21 automatically determines (e.g., via sensors 80 and/or computer system 38') that tanker truck 12 is empty or is about to be emptied. There can be any number of well sites of a plurality of well sites (e.g., well sites 10*a*, 10*b*, 10*c*, . . . ) being simultaneously monitored and served by waste fluid disposal method 21.

In addition or alternatively, FIGS. 5A-5E illustrate various example method blocks pertaining to method 21, which is further illustrated in FIGS. 1-4. The method blocks shown in FIGS. 5A-5E are not necessarily in any particular order or sequence.

Figure 5A:
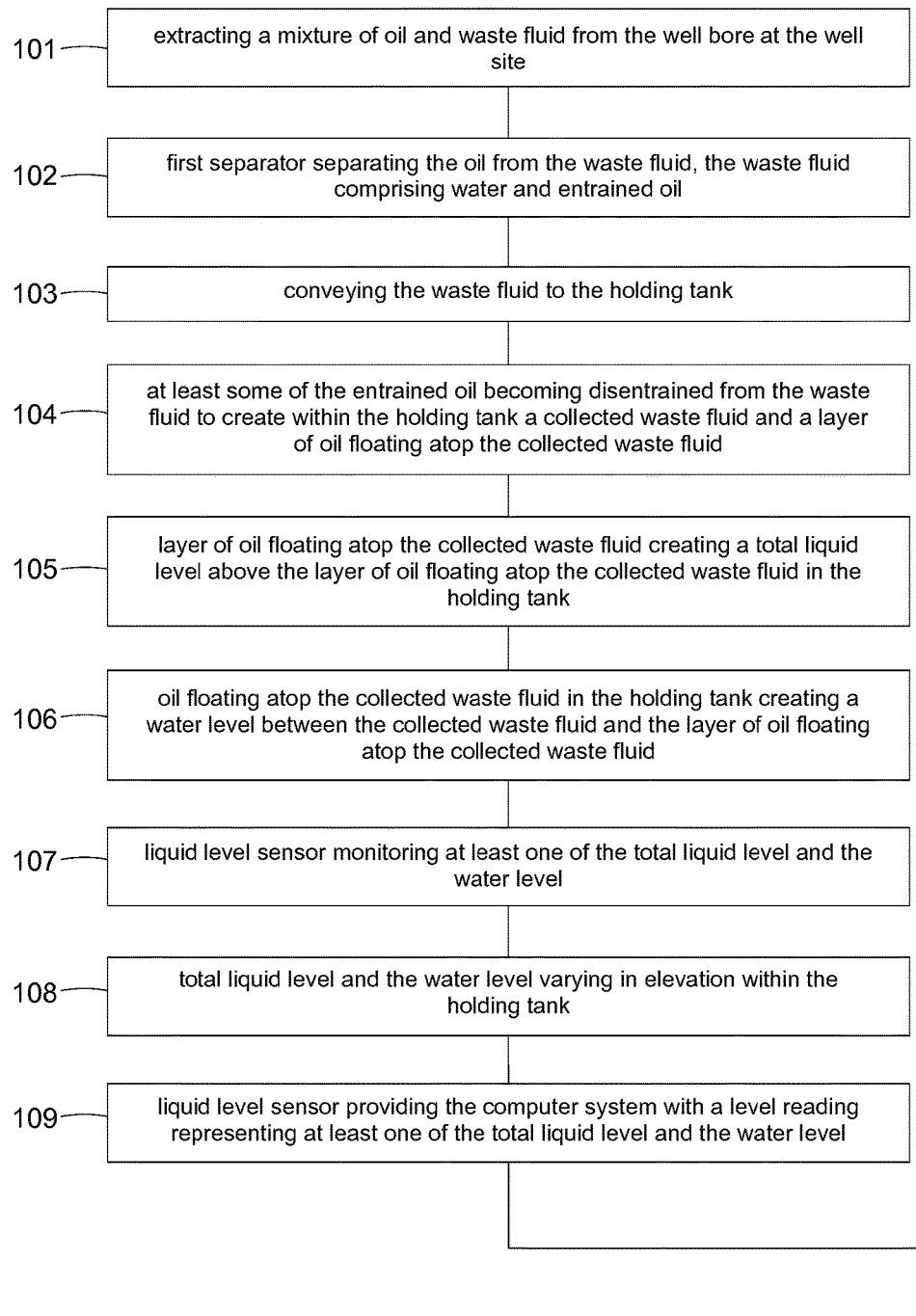

Referring to FIG. 5A, block 101 represents extracting a mixture 40 of oil 42 and waste fluid 44 from well bore 34 at well site 10*a*. Block 102 represents first separator 9 separating oil 42 from waste fluid 44, wherein waste fluid 44 comprises water and entrained oil 46. Block 103 represents conveying waste fluid 44 to holding tank 1. Block 104 represents at least some of the entrained oil 46 becoming disentrained from waste fluid 44 to create within holding tank 1 a collected waste fluid 50 and a layer of oil 48 floating atop collected waste fluid 50. Block 105 represents layer of oil 48 floating atop collected waste fluid 50, thereby creating total liquid level 7 above the layer of oil 48 floating atop the collected waste fluid 50 in holding tank 1. Block 106 represents oil floating atop collected waste fluid 50 in holding tank 1, thereby creating water level 52 between collected waste fluid 50 and the layer of oil 48 floating atop collected waste fluid 50. Block 107 represents liquid level sensor 2 monitoring the total liquid level 7 and/or the water level 52. Block 108 represents the total liquid level 7 and the water level 52 varying in elevation within holding tank 1. Block 109 represents liquid level sensor 2 providing computer system 38 with a level reading 54 representing the total liquid level 7 and/or the water level 52.

Referring to FIG. 5B, block 110 represents level reading 54 varying in response to total liquid level 7 varying and/or the water 52 level varying. Block 111 represents, via server system 56, the computer system 38 communicating level reading 54 to trucking company 26, disposal company 28, and/or well company 24. Block 112 represents driver 30 driving tanker truck 12 to well site 10*a*. Block 113 represents computer system 38 detecting ID source 66 associated with driver 30 and/or tanker truck 12, and the computer system 38 thereby concluding that tanker truck 12 is at well site 10*a*. Block 114 represents computer system 38 recording an identifier (e.g., MAC address, etc.) associated with ID source 66. Block 115 represents computer system 38 establishing a timestamp indicating a time of day when tanker truck 12 was at well site 10a. Block 116 represents computer system 38 establishing a date-stamp indicating a date when tanker truck 12 was at well site 10a. Block 117 represents conveying a portion of fluid 72 from holding tank 1 to tanker truck 12, wherein the portion of fluid 72 comprises at least some of the collected waste water 50. Block 118 represents, based on level reading 54 varying in response to the total liquid level 7 varying and/or the water level 52 varying while tanker truck 12 is at well site 10a, computer system 38 determining a quantity of the portion of fluid 72 conveyed from holding tank 1 to tanker truck 12. Block 119 represents driving tanker truck 12 with the portion of fluid 72 to disposal site 22.

Figure 5C:
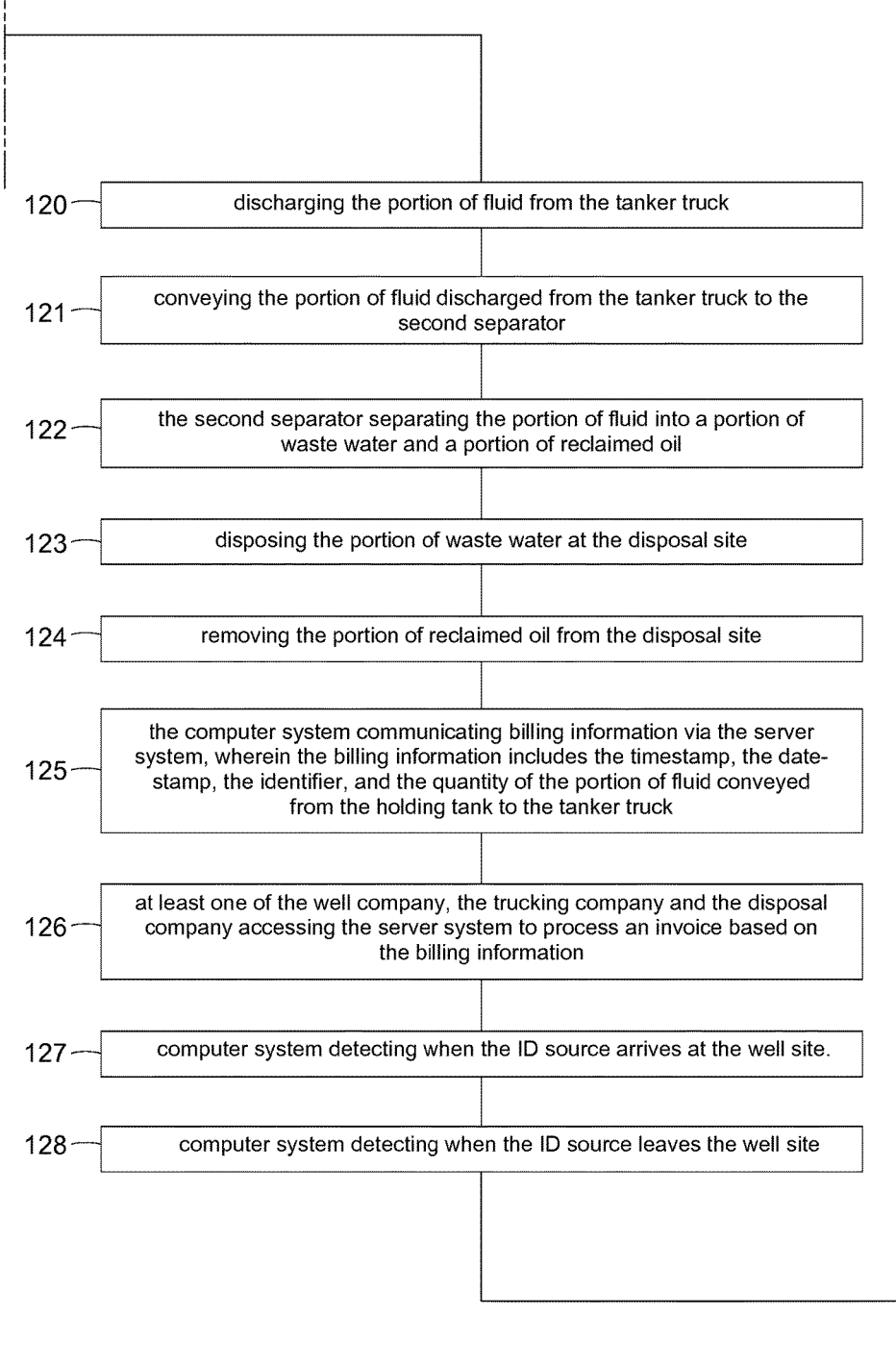

Referring to FIG. 5C, block 120 represents discharging the portion of fluid 72 from tanker truck 12. Block 121 represents conveying the portion of fluid 72 discharged from tanker truck 12 to second separator 68. Block 122 represents second separator 68 separating the portion of fluid 72 into a portion of waste water 74 and a portion of reclaimed oil 76. Block 123 represents disposing the portion of waste water 74 at disposal site 22. Block 124 represents removing the portion of reclaimed oil 76 from disposal site 22 (e.g., selling oil 76). Block 125 represents the computer system (e.g., computer system 38' and/or 38) communicating billing information via server system 38, wherein the billing information includes the timestamp, the date-stamp, the identifier, and the quantity of the portion of fluid 72 conveyed from holding tank 1 to tanker truck 12. Block 126 represents well company 24, trucking company 26, and/or disposal company 28 accessing server system 56 to help process an invoice based on the billing information. Block 127 represents computer system 38 detecting when ID source 66 arrives at well site 18a. Block 128 represents computer system 38 detecting when ID source 66 leaves well site 10a.

Figure 5D:
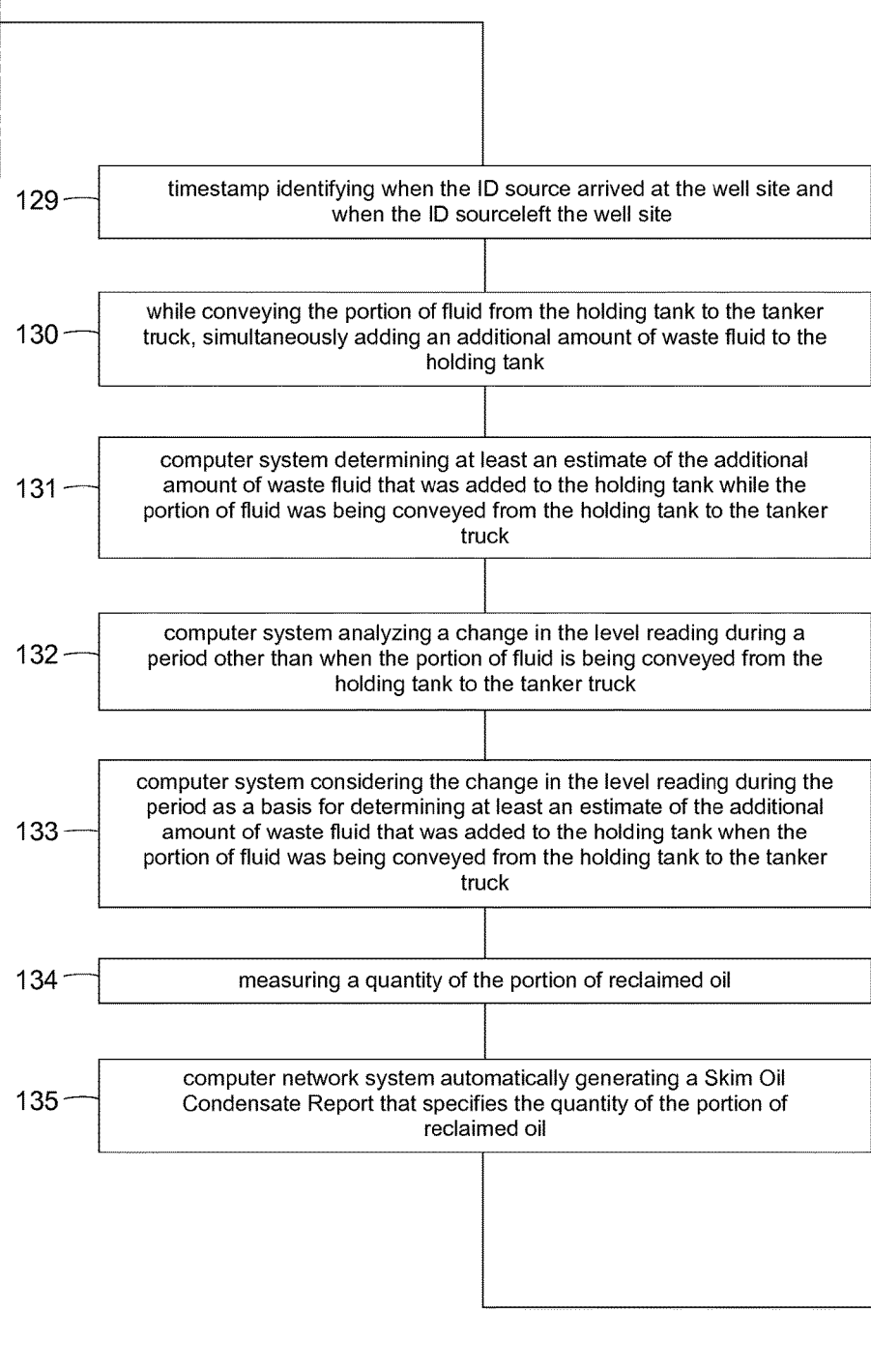

Referring to FIG. 5D, block 129 represents the timestamp identifying when ID source 66 arrived at well site 10a and when ID source 66 left well site 10a. Block 130 represents, while conveying the portion of fluid 72 from holding tank 1 to tanker truck 12, simultaneously adding an additional amount of waste fluid 44 to holding tank 1. Block 131 represents computer system 38 determining at least an estimate of the additional amount of waste fluid 44 that was added to holding tank 1 while the portion of fluid 72 was being conveyed from holding tank 1 to tanker truck 12. Block 132 represents computer system 38 analyzing a change in level reading 54 during a period other than when the portion of fluid 72 is being conveyed from holding tank 1 to tanker truck 12. Block 133 represents computer system 38 considering the change in the level reading 54 during the period as a basis for determining at least an estimate of the additional amount of waste fluid 44 that was added to holding tank 1 when the portion of fluid 72 was being conveyed from holding tank 1 to tanker truck 12. Block 134 represents measuring a quantity of the portion of reclaimed oil 76. Block 135 represents the computer network system automatically generating a Skim Oil Condensate Report 82 that specifies the quantity of the portion of reclaimed oil 76.

Referring to FIG. 5E, block 136 represents the computer network system 64 (e.g., computer system 38, computer system 38', server system 56 and/or the computers of companies 24, 26 and 28) notifying at least one of the well company 24, the trucking company 26 and the disposal company 28 of the Skim Oil Condensate Report 82. Block 137 represents computer network system 64 determining a location of tanker truck 12 after discharging the portion of fluid 72 from tanker truck 12, whereby the computer network system 72 determines the location of tanker truck 12 when tanker truck 12 is substantially empty. Block 138 represents computer network system 72 identifying a second holding tank (like tank 1 but at another well site, e.g., at well sites 10b or 10c) of the plurality of holding tanks, wherein the second holding tank has at least a predetermined quantity of waste fluid ready to be conveyed to tanker truck 12. Block 139 represents computer network system 64 dispatching tanker truck 12 to the second holding tank at another well site such as at well site 10b or 10c. Block 140 represents computer network system 64 determining an anticipated point in time when holding tank 1 will have at least a predetermined quantity of fluid 44 ready to be conveyed to tanker truck 12. Block 141 represents, based on the anticipated point in time, the computer network system 64 dispatching tanker truck 12 to the second holding tank. Block 142 represents the computer network system 64 determining the anticipated point in time based on a level reading 54 and a rate in which level reading 54 changes. Block 143 represents the level reading 54 indicating both the total liquid level 7 and the water level 52.

Although certain example methods, apparatus and articles of manufacture have been described herein, the scope of the coverage of this patent is not limited thereto. Rather, this patent covers all methods, apparatus and articles of manufacture fairly falling within the scope of the following claims either literally or under the doctrine of equivalents.

The invention claimed is:

1. A method for handling water and oil at a well site and a disposal site, wherein the method involves the use of at least one of a holding tank at the well site, a wellbore at the well site, a first separator at the well site, a second separator at the disposal site, a liquid level sensor associated with the holding tank, a tanker truck driven by a driver, an ID source associated with at least one of the tanker truck and the driver, a computer system, a server system, a well company associated with the well site, a trucking company associated with the tanker truck, and a disposal company associated with the disposal site, the method comprising:
  extracting a mixture of oil and waste fluid from the well bore at the well site;
  the first separator separating the oil from the waste fluid, the waste fluid comprising water and entrained oil;
  conveying the waste fluid to the holding tank;
  at least some of the entrained oil becoming disentrained from the waste fluid to create within the holding tank a collected waste fluid and a layer of oil floating atop the collected waste fluid;
  the layer of oil floating atop the collected waste fluid creating a total liquid level above the layer of oil floating atop the collected waste fluid in the holding tank;
  the layer of oil floating atop the collected waste fluid in the holding tank creating a water level between the collected waste fluid and the layer of oil floating atop the collected waste fluid;
  the liquid level sensor monitoring at least one of the total liquid level and the water level;
  the total liquid level and the water level varying in elevation within the holding tank;
  the liquid level sensor providing the computer system with a level reading representing at least one of the total liquid level and the water level;
  the level reading varying in response to at least one of the total liquid level varying and the water level varying;

via the server system, the computer system communicating the level reading to at least one of the trucking company, the disposal company and the well company;
the driver driving the tanker truck to the well site;
the computer system detecting the ID source associated with at least one of the driver and the tanker truck, and the computer system thereby concluding that the tanker truck is at the well site;
the computer system recording an identifier associated with the ID source;
the computer system establishing a timestamp indicating a time of day when the tanker truck was at the well site;
the computer system establishing a date-stamp indicating a date when the tanker truck was at the well site;
conveying a portion of fluid from the holding tank to the tanker truck, the portion of fluid comprising at least some of the collected waste water;
while conveying the portion of fluid from the holding tank to the tanker truck, simultaneously adding an additional amount of waste fluid to the holding tank;
based on the level reading varying in response to at least one of the total liquid level varying and the water level varying while the tanker truck is at the well site, the computer system determining a quantity of the portion of fluid conveyed from the holding tank to the tanker truck;
the computer system analyzing a change in the level reading during a period other than when the portion of fluid is being conveyed from the holding tank to the tanker truck;
driving the tanker truck with the portion of fluid to the disposal site;
discharging the portion of fluid from the tanker truck;
conveying the portion of fluid discharged from the tanker truck to the second separator;
the second separator separating the portion of fluid into a portion of waste water and a portion of reclaimed oil;
disposing the portion of waste water at the disposal site;
removing the portion of reclaimed oil from the disposal site;
the computer system communicating billing information via the server system, wherein the billing information includes the timestamp, the date-stamp, the identifier, and the quantity of the portion of fluid conveyed from the holding tank to the tanker truck; and
at least one of the well company, the trucking company and the disposal company accessing the server system to help process an invoice based on the billing information.

2. The method of claim 1, wherein the ID source is a smartphone.

3. The method of claim 1, wherein the identifier is a MAC address.

4. The method of claim 1, wherein the identifier is a telephone number.

5. The method of claim 1, wherein the identifier is a user authentication password.

6. The method of claim 1, further comprising, based on the identifier, selectively allowing and restricting access to at least one of the well site, the first separator, the second separator, the holding tank, and the disposal site.

7. The method of claim 1, wherein the identifier is a string of characters.

8. The method of claim 1, wherein the ID source is an RFID element.

9. The method of claim 1, further comprising:
the computer system detecting when the ID source arrives at the well site;
the computer system detecting when the ID source leaves the well site; and
the timestamp identifying when the ID source arrived at the well site and when the ID source left the well site.

10. The method of claim 1, further comprising: the computer system determining at least an estimate of the additional amount of waste fluid that was added to the holding tank while the portion of fluid was being conveyed from the holding tank to the tanker truck.

11. The method of claim 1, further comprising: the computer system considering the change in the level reading during the period as a basis for determining at least an estimate of the additional amount of waste fluid that was added to the holding tank when the portion of fluid was being conveyed from the holding tank to the tanker truck.

12. The method of claim 1, wherein the computer system and the server system are part of a computer network system, and the method further comprising:
measuring a quantity of the portion of reclaimed oil;
the computer network system automatically generating a Skim Oil Condensate Report that specifies the quantity of the portion of reclaimed oil; and
the computer network system notifying at least one of the well company, the trucking company and the disposal company of the Skim Oil Condensate Report.

13. The method of claim 1, wherein holding tank is one of a plurality of holding tanks at a plurality of well sites, and the computer system and the server system are part of a computer network system that includes a GPS unit associated with at least one of the tanker truck, the ID source and the driver; and the method further comprising:
the computer network system determining a location of the tanker truck after discharging the portion of fluid from the tanker truck, whereby the computer network system determines the location of the tanker truck when the tanker truck is substantially empty;
the computer network system identifying a second holding tank of the plurality of holding tanks, wherein the second holding tank has at least a predetermined quantity of fluid ready to be conveyed to the tanker truck; and
the computer network system dispatching the tanker truck to the second holding tank.

14. The method of claim 1, wherein the holding tank is one of a plurality of holding tanks at a plurality of well sites, and the computer system and the server system are part of a computer network system that includes a GPS unit associated with at least one of the tanker truck, the ID source and the driver; and the method further comprising:
the computer network system determining an anticipated point in time when the holding tank will have at least a predetermined quantity of fluid ready to be conveyed to the tanker truck; and
based on the anticipated point in time, the computer network system dispatching the tanker truck to the second holding tank.

15. The method of claim 14, wherein the computer network system determines the anticipated point in time based on the level reading and a rate in which the level reading changes.

16. A method for handling water and oil at a well site and a disposal site, wherein the method involves the use of at least one of a holding tank at the well site, a wellbore at the well site, a first separator at the well site, a second separator at the disposal site, a liquid level sensor associated with the holding tank, a tanker truck driven by a driver, an ID source associated with at least one of the tanker truck and the driver, a computer system, a server system, a well company associated with the well site, a trucking company associated with the tanker truck, and a disposal company associated with the disposal site, the method comprising:
- extracting a mixture of oil and waste fluid from the well bore at the well site;
- the first separator separating the oil from the waste fluid, the waste fluid comprising water and entrained oil;
- conveying the waste fluid to the holding tank;
- at least some of the entrained oil becoming disentrained from the waste fluid to create within the holding tank a collected waste fluid and a layer of oil floating atop the collected waste fluid;
- the layer of oil floating atop the collected waste fluid creating a total liquid level above the layer of oil floating atop the collected waste fluid in the holding tank;
- the oil floating atop the collected waste fluid in the holding tank creating a water level between the collected waste fluid and the layer of oil floating atop the collected waste fluid;
- the liquid level sensor monitoring at least one of the total liquid level and the water level;
- the total liquid level and the water level varying in elevation within the holding tank;
- the liquid level sensor providing the computer system with a level reading representing at least one of the total liquid level and the water level;
- the level reading varying in response to at least one of the total liquid level varying and the water level varying;
- via the server system, the computer system communicating the level reading to at least one of the trucking company, the disposal company and the well company;
- the driver driving the tanker truck to the well site;
- the computer system detecting the ID source associated with at least one of the driver and the tanker truck, and the computer system thereby concluding that the tanker truck is at the well site;
- the computer system recording an identifier associated with the ID source;
- the computer system establishing a timestamp indicating a time of day when the tanker truck was at the well site;
- the computer system establishing a date-stamp indicating a date when the tanker truck was at the well site;
- conveying a portion of fluid from the holding tank to the tanker truck, the portion of fluid comprising at least some of the collected waste water;
- based on the level reading varying in response to at least one of the total liquid level varying and the water level varying while the tanker truck is at the well site, the computer system determining a quantity of the portion of fluid conveyed from the holding tank to the tanker truck;
- driving the tanker truck with the portion of fluid to the disposal site;
- discharging the portion of fluid from the tanker truck;
- conveying the portion of fluid discharged from the tanker truck to the second separator;
- the second separator separating the portion of fluid into a portion of waste water and a portion of reclaimed oil;
- disposing the portion of waste water at the disposal site;
- removing the portion of reclaimed oil from the disposal site;
- the computer system communicating billing information via the server system, wherein the billing information includes the timestamp, the date-stamp, the identifier, and the quantity of the portion of fluid conveyed from the holding tank to the tanker truck;
- at least one of the well company, the trucking company and the disposal company accessing the server system to help process an invoice based on the billing information;
- while conveying the portion of fluid from the holding tank to the tanker truck, simultaneously adding an additional amount of waste fluid to the holding tank;
- the computer system determining at least an estimate of the additional amount of waste fluid that was added to the holding tank while the portion of fluid was being conveyed from the holding tank to the tanker truck;
- the computer system analyzing a change in the level reading during a period other than when the portion of fluid is being conveyed from the holding tank to the tanker truck; and
- the computer system considering the change in the level reading during the period as a basis for determining at least an estimate of the additional amount of waste fluid that was added to the holding tank when the portion of fluid was being conveyed from the holding tank to the tanker truck.

17. A method for handling water and oil at a well site and a disposal site, wherein the method involves the use of at least one of a holding tank at the well site, a wellbore at the well site, a first separator at the well site, a second separator at the disposal site, a liquid level sensor associated with the holding tank, a tanker truck driven by a driver, an ID source associated with at least one of the tanker truck and the driver, a computer system, a server system, a well company associated with the well site, a trucking company associated with the tanker truck, and a disposal company associated with the disposal site, the method comprising:
- extracting a mixture of oil and waste fluid from the well bore at the well site;
- the first separator separating the oil from the waste fluid, the waste fluid comprising water and entrained oil;
- conveying the waste fluid to the holding tank;
- at least some of the entrained oil becoming disentrained from the waste fluid to create within the holding tank a collected waste fluid and a layer of oil floating atop the collected waste fluid;
- the layer of oil floating atop the collected waste fluid creating a total liquid level above the layer of oil floating atop the collected waste fluid in the holding tank;
- the layer of oil floating atop the collected waste fluid in the holding tank creating a water level between the collected waste fluid and the layer of oil floating atop the collected waste fluid;
- the liquid level sensor monitoring at least one of the total liquid level and the water level;
- the total liquid level and the water level varying in elevation within the holding tank;
- the liquid level sensor providing the computer system with a level reading representing at least one of the total liquid level and the water level;
- the level reading varying in response to at least one of the total liquid level varying and the water level varying, and the level reading indicating both the total liquid level and the water level;

via the server system, the computer system communicating the level reading to at least one of the trucking company, the disposal company and the well company;

the driver driving the tanker truck to the well site;

the computer system detecting the ID source associated with at least one of the driver and the tanker truck, and the computer system thereby concluding that the tanker truck is at the well site;

the computer system recording an identifier associated with the ID source;

the computer system establishing a timestamp indicating a time of day when the tanker truck was at the well site;

the computer system establishing a date-stamp indicating a date when the tanker truck was at the well site;

conveying a portion of fluid from the holding tank to the tanker truck, the portion of fluid comprising at least some of the collected waste water;

while conveying the portion of fluid from the holding tank to the tanker truck, simultaneously adding an additional amount of waste fluid to the holding tank;

based on the level reading varying in response to at least one of the total liquid level varying and the water level varying while the tanker truck is at the well site, the computer system determining a quantity of the portion of fluid conveyed from the holding tank to the tanker truck;

driving the tanker truck with the portion of fluid to the disposal site;

discharging the portion of fluid from the tanker truck;

conveying the portion of fluid discharged from the tanker truck to the second separator;

the second separator separating the portion of fluid into a portion of waste water and a portion of reclaimed oil;

disposing the portion of waste water at the disposal site;

removing the portion of reclaimed oil from the disposal site;

the computer system communicating billing information via the server system, wherein the billing information includes the timestamp, the date-stamp, the identifier, and the quantity of the portion of fluid conveyed from the holding tank to the tanker truck; and at least one of the well company, the trucking company and the disposal company accessing the server system to help process an invoice based on the billing information.

\* \* \* \* \*